US007563164B2

(12) United States Patent
D'Esposito

(10) Patent No.: US 7,563,164 B2
(45) Date of Patent: Jul. 21, 2009

(54) INSTANT RESULT LOTTERY SYSTEM AND METHOD

(76) Inventor: Salvatore D'Esposito, 3235 Garfield St., Carlsbad, CA (US) 92008

( * ) Notice: Subject to any disclaimer, the term of this patent is extended or adjusted under 35 U.S.C. 154(b) by 486 days.

(21) Appl. No.: 11/049,322

(22) Filed: Feb. 1, 2005

(65) Prior Publication Data

US 2006/0172793 A1 Aug. 3, 2006

(51) Int. Cl.
*G06F 17/00* (2006.01)
*G06F 19/00* (2006.01)

(52) U.S. Cl. ............................ 463/17; 463/16; 463/18; 463/19; 463/20; 463/25; 273/138.1; 273/139; 273/269

(58) Field of Classification Search ................... 463/17, 463/16–20, 25; 273/138.1, 139, 269
See application file for complete search history.

(56) References Cited

U.S. PATENT DOCUMENTS

| | | | | |
|---|---|---|---|---|
| 5,249,801 | A * | 10/1993 | Jarvis | 273/148 R |
| 5,317,135 | A * | 5/1994 | Finocchio | 463/17 |
| 5,772,510 | A * | 6/1998 | Roberts | 463/17 |
| 5,871,398 | A * | 2/1999 | Schneier et al. | 463/16 |
| 5,935,000 | A * | 8/1999 | Sanchez et al. | 463/17 |
| 5,979,894 | A * | 11/1999 | Alexoff | 273/139 |
| 6,086,477 | A * | 7/2000 | Walker et al. | 463/17 |
| 6,210,276 | B1 * | 4/2001 | Mullins | 463/27 |
| 6,277,026 | B1 * | 8/2001 | Archer | 463/42 |
| 6,582,304 | B2 * | 6/2003 | Walker et al. | 463/17 |
| 7,186,180 | B2 * | 3/2007 | Lathrop et al. | 463/17 |
| 2002/0119817 | A1 * | 8/2002 | Behm et al. | 463/17 |
| 2003/0050109 | A1 * | 3/2003 | Caro et al. | 463/17 |
| 2003/0114210 | A1 * | 6/2003 | Meyer et al. | 463/17 |
| 2003/0134672 | A1 * | 7/2003 | Fulton | 463/17 |
| 2003/0139212 | A1 | 7/2003 | Fulton | |
| 2004/0054593 | A1 | 3/2004 | Van Luchen | |
| 2005/0064930 | A1 * | 3/2005 | Jubinville et al. | 463/17 |
| 2005/0075158 | A1 * | 4/2005 | Walker et al. | 463/16 |
| 2006/0183531 | A1 * | 8/2006 | Thomas | 463/18 |

FOREIGN PATENT DOCUMENTS

| | | |
|---|---|---|
| EP | 1463005 | 9/2004 |
| WO | 02087713 | 7/2002 |

OTHER PUBLICATIONS

Past New Jersey State Lottery Instant Scratch Off Tickets. 2001-2003.*

* cited by examiner

*Primary Examiner*—Peter DungBa Vo
*Assistant Examiner*—Milap Shah
(74) *Attorney, Agent, or Firm*—Mintz, Levin, Cohn, Ferris, Glovsky & Popeo, P.C.

(57) ABSTRACT

A method executed by a system for playing a lottery includes printing two or more sets of numbers on a ticket. Each set of numbers is randomly-selected by a random number generator program executed by a computer terminal. Each set of numbers forms a row on the ticket and ascends in numerical quantity across the row. Each number in each set of numbers is arranged in a column with a number in another set of numbers. The method further includes determining that the ticket is a winning ticket if a column includes a predetermined number of identical numbers.

19 Claims, 4 Drawing Sheets

200

INSTANT RESULT LOTTERY SYSTEM AND METHOD

BACKGROUND

Since the mid-1960s, state lotteries have become big business and an important revenue source for states that sanction them. Lotteries now provide in excess of $40 billion to state coffers. Most states that offer a state lottery provide more than one type of lottery "game." For example, the California lottery system offers more than five types of lottery game. Central to the success of such lottery games is a reliance by customers that their chance of winning, i.e. a probability of having a single ticket being a winner, is the same for all players per ticket.

One of the most popular forms of lottery game is a game in which players obtain a series of six numbers printed on a ticket in a row, as shown in FIG. 1. The ticket may include any number of rows of numbers, called "picks." The ticket in FIG. 1 includes 6 picks, i.e. sets of numbers in a row—the first five numbers being an ascending set of numbers from 1 to 47, and a sixth number selected from 1 to 27. Each pick represents a separate cost, and as such, unless the potential jackpot is very large, a majority of players may only buy one or two picks.

This type of lottery ticket is similar to a "Super Lotto" game of the California lottery, where the first five numbers represents the basic lottery portion, and the sixth number is a bonus number, known as a MEGA number, that substantially decreases odds of a complete match by a single pick, and thereby allows for ever-increasing jackpot amounts. To win, one row of numbers on the ticket must match a set of numbers randomly drawn by lottery officials.

The numbers may be selected from a predetermined range of numbers by a player, or randomly drawn by a computer. For example, in the California lottery, players may choose to receive one or more "Quick Picks" in which a terminal randomly picks their numbers. In this example, a microprocessor in the terminal begins a counting process as soon as a keyboard key is pressed by a terminal operator, typically a clerk at an establishment that sells lottery tickets. Each time another key is pressed, the processor computes the elapsed time, then takes the resulting figures and scrambles them with numbers issued on the last ticket sale. Then, the newly-generated pick numbers are arranged in ascending order along with the randomly-generated MEGA number, and printed on a ticket.

Each time a ticket is printed, whether with player-selected numbers or randomly-generated picks, a remote server is contacted and the picks are registered. These numbers will be tracked and accessed upon a random drawing of winning numbers, so that a winner can be determined. The winning numbers are typically drawn by a machine that mixes and randomly retrieves balls of uniform size and weight printed with numbers. The machine are adapted to ensure a completely random process. Alternatively, a standalone computer may be used to randomly-generate winning numbers.

Players of this type of lottery game must endure two certainties: a completely random drawing in which the chances of winning are the same for each pick, and a time delay between the time one or more picks are printed and the time a winning set of numbers are drawn.

SUMMARY

For the style of lottery game described above, a way for a player to achieve an instant result is beneficial, particularly if such result is a chance of winning in addition to the conventional method of determining if there is a match between a pick and the random drawing. Such a new way to win can substantially increase players' interest, thus driving ticket sales higher. Accordingly, lottery systems can achieve much greater revenue without the need for a new lottery infrastructure.

In accordance with an embodiment, a method of playing a lottery includes printing two or more sets of numbers on a ticket. Each set of numbers is randomly-selected by a random number generator program executed by a computer terminal. Each set of numbers forms a row on the ticket and ascends in numerical quantity across the row. Each number in each set of numbers is arranged in a column with a number in another set of numbers. The method further includes determining that the ticket is a winning ticket if a column includes a predetermined number of identical numbers.

In accordance with another embodiment, a method of playing a lottery includes selecting, with a random number generator program executed by a computer terminal, two or more sets of numbers ascending in numerical quantity. The method further includes printing the two or more sets of numbers on a ticket, each set of numbers forming a row on the ticket and ascending in numerical quantity across the row, each number in each set of numbers being arranged in a column with a number in another set of numbers. The method further includes determining whether a column in the ticket includes a predetermined number of identical numbers, and designating the ticket as a winning ticket if a column in the ticket includes the predetermined number of identical numbers.

In accordance with yet another embodiment, a lottery system includes a computer terminal executing a random number generator program that randomly generates two or more sets of numbers for a player, the computer terminal further configured to print the two or more sets of numbers on a ticket, where each set of numbers forms a row and ascends in numerical quantity across the row, and each number in each set of numbers is arranged in a column with a number in another set of numbers. The system further includes a server connected to the computer terminal and configured to register the two or more sets of numbers that are printed on the ticket, and to determine whether a column on the ticket includes a predetermined number of identical numbers.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and methods described herein relate to a lottery game utilizing a conventional printed lottery ticket, in which a player can get immediate results as to a first chance aspect of the lottery game before a second chance aspect is executed. In conventional lottery systems, the second chance aspect involves a random drawing of winning numbers by lottery officials, to which the numbers on a lottery ticket are compared.

In various embodiments of the present invention, the first chance aspect is provided by arranging randomly-picked numbers on a ticket in a row-and-column format, where each row represents an independent set of numbers printed in a numerically ascending order from left to right. Each number in the row is selected from a range of numbers, for example 1 to 47. Accordingly, there is a likelihood, although a very low chance, that identical numbers from two or more sets of numbers will align in the same column. A greater number of rows having identical numbers in corresponding column locations is inversely and exponentially proportional to such an outcome.

Figure 1:
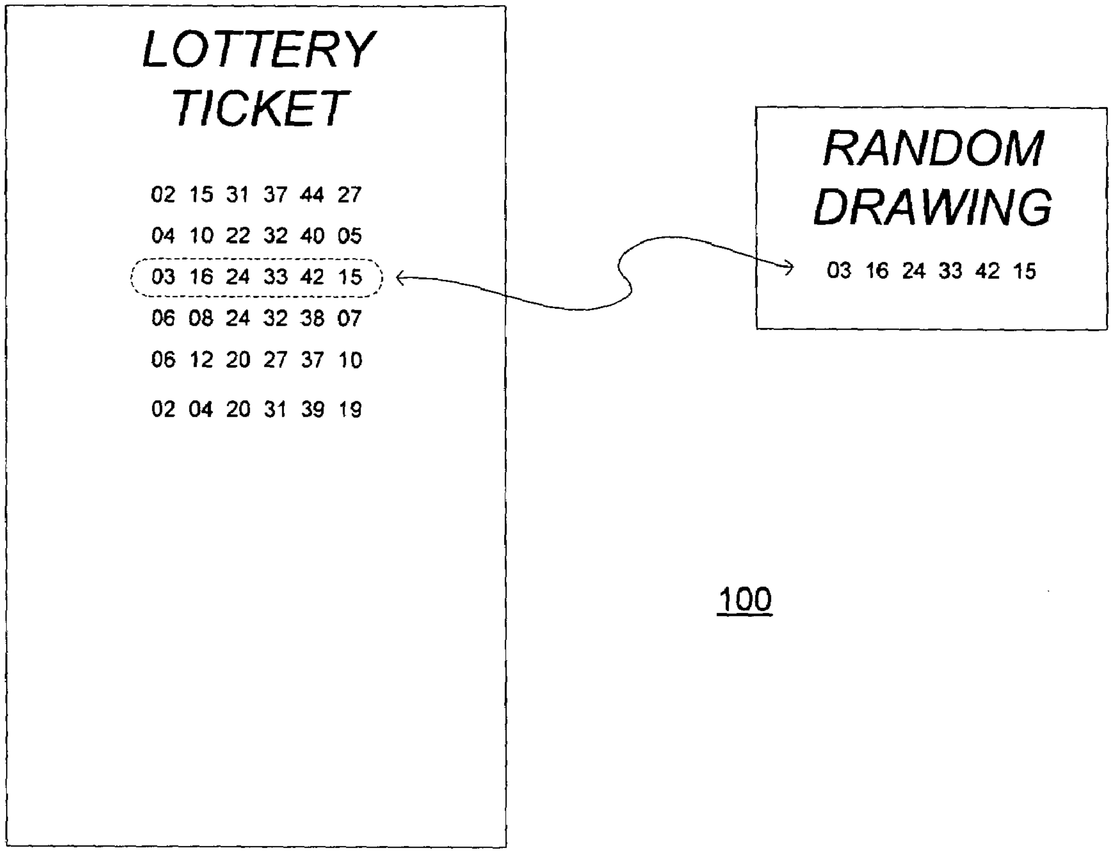
FIG. 1 (PRIOR ART)
FIG. 1 shows a conventional lottery ticket with number picks.
Figure 2:
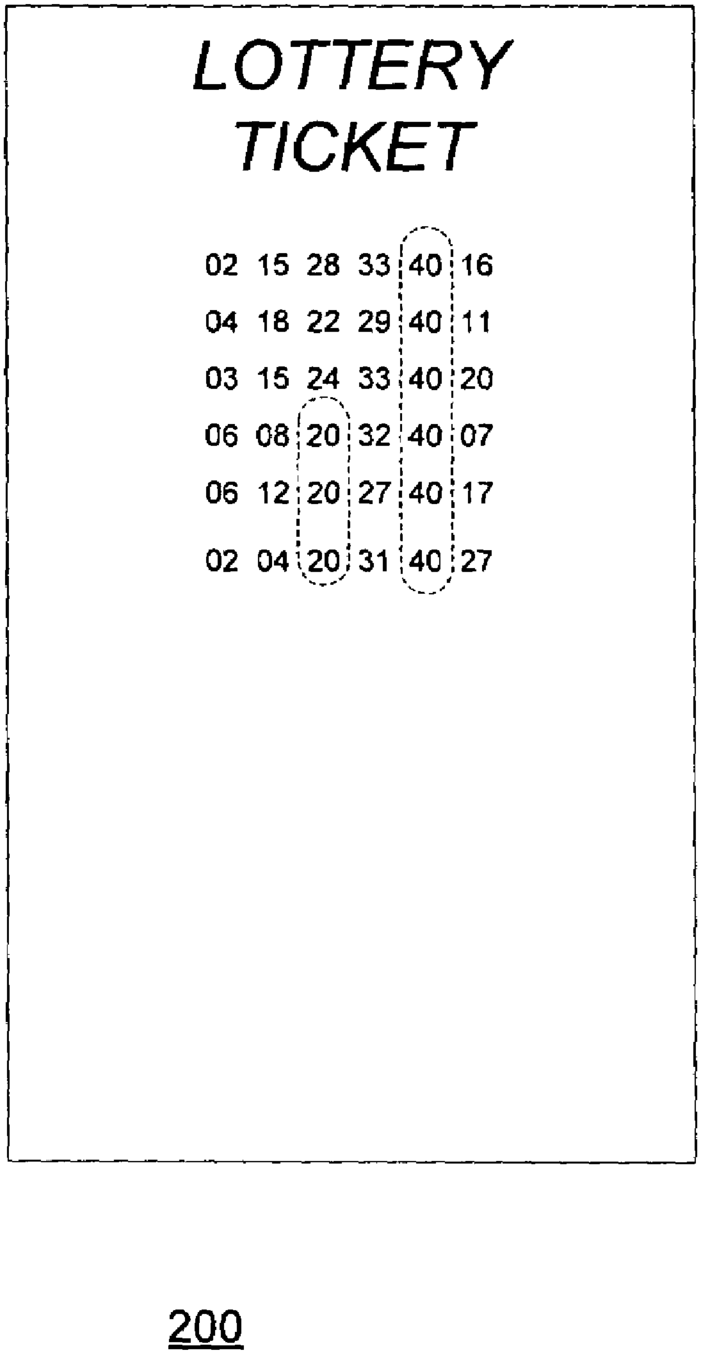
FIG. 2 illustrates an example of a instant result lottery game.

FIG. 2 illustrates a lottery ticket 200 having six sets of numbers arranged in six corresponding rows. Each set of number includes five numbers of ascending numerical value across the row, each having a value between 1 and 47, and a sixth number representing a bonus number having a value between 1 and 27. These numbers and ranges are merely exemplary, and should not be understood as limiting the embodiments described herein in any way.

In an embodiment, a lottery system can provide for a "win" if a column location in a predetermined number of sets of numbers are identical. Preferably, the predetermined is greater than two, and more preferably at least five. The greater the predetermined number is, the more sets of numbers players will buy, and larger revenues for the lottery system will result. FIG. 2 shows two such "wins:" a first win having a predetermined number of 6 (represented by the column containing six contiguous number "40s"), and a second win having a predetermined number of 3 (represented by the column containing three contiguous "20s").

Figure 3:
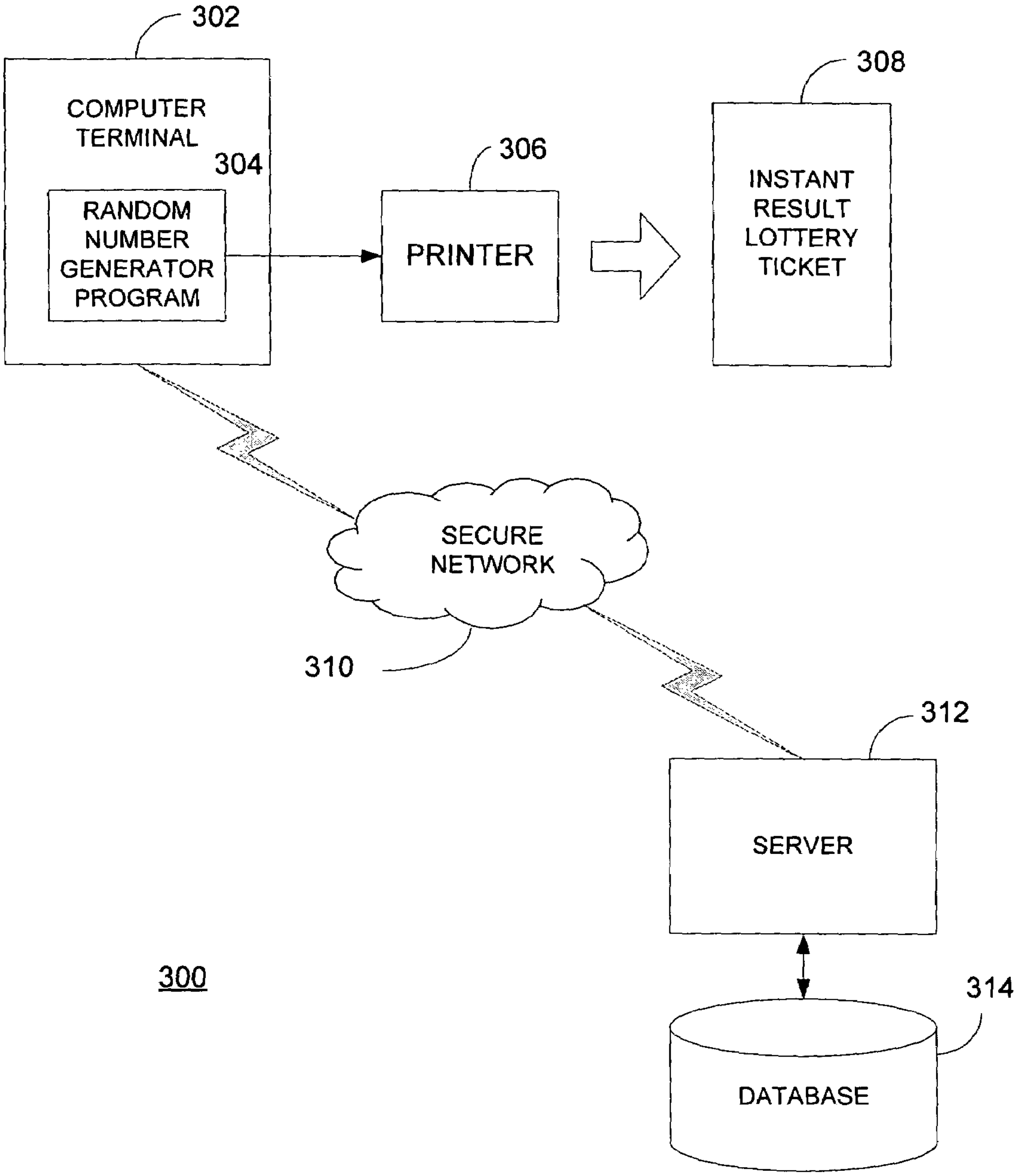
FIG. 3 is a block diagram of an instant result lottery system.

FIG. 3 is a block diagram of a lottery system 300 for playing an instant result lottery game. The lottery system 300 includes a computer terminal 302 having a random number generator program 304. The random number generator program 304 is preferably a local application running the computer terminal 302, and executes independent of input signals external to the computer terminal. As such, pure randomness is preserved and numbers are generated without outside influence.

The random number generator program 304 can be implemented in software, firmware, or hardware. The random number generator program 304 electronically generates a set of random numbers. The computer terminal 302, either using the random number generator program 304 or other program, arranges the numbers into a set of numbers, where each set of numbers has a uniform numbers arranged from smallest to largest. Each of the sets of ascending numbers are then related by player or buyer, and sent to a printer 306 for printing on a ticket to create an instant result lottery ticket 308, substantially as shown in FIG. 2.

Each instant result lottery ticket 308 can have two or more sets of numbers, arranged as rows, where each number in the set of number aligns with a number in a set of numbers either below and/or above it. Thus aligned, it is easy to determine whether numbers in a column are identical. After the numbers are printed and the instant result lottery ticket 308 is created, the sets of numbers are transmitted over a secure network 310 to a server 312, where they will be registered for validation. The server 312 stores the sets of numbers in a database 314 or other memory structure, in a format where column structures of the sets of numbers are discernable. Thus, the sets of numbers may be stored with vector or column-location information to indicate a particular column for each individual number, and be able to relate each number to its respective column.

Figure 4:
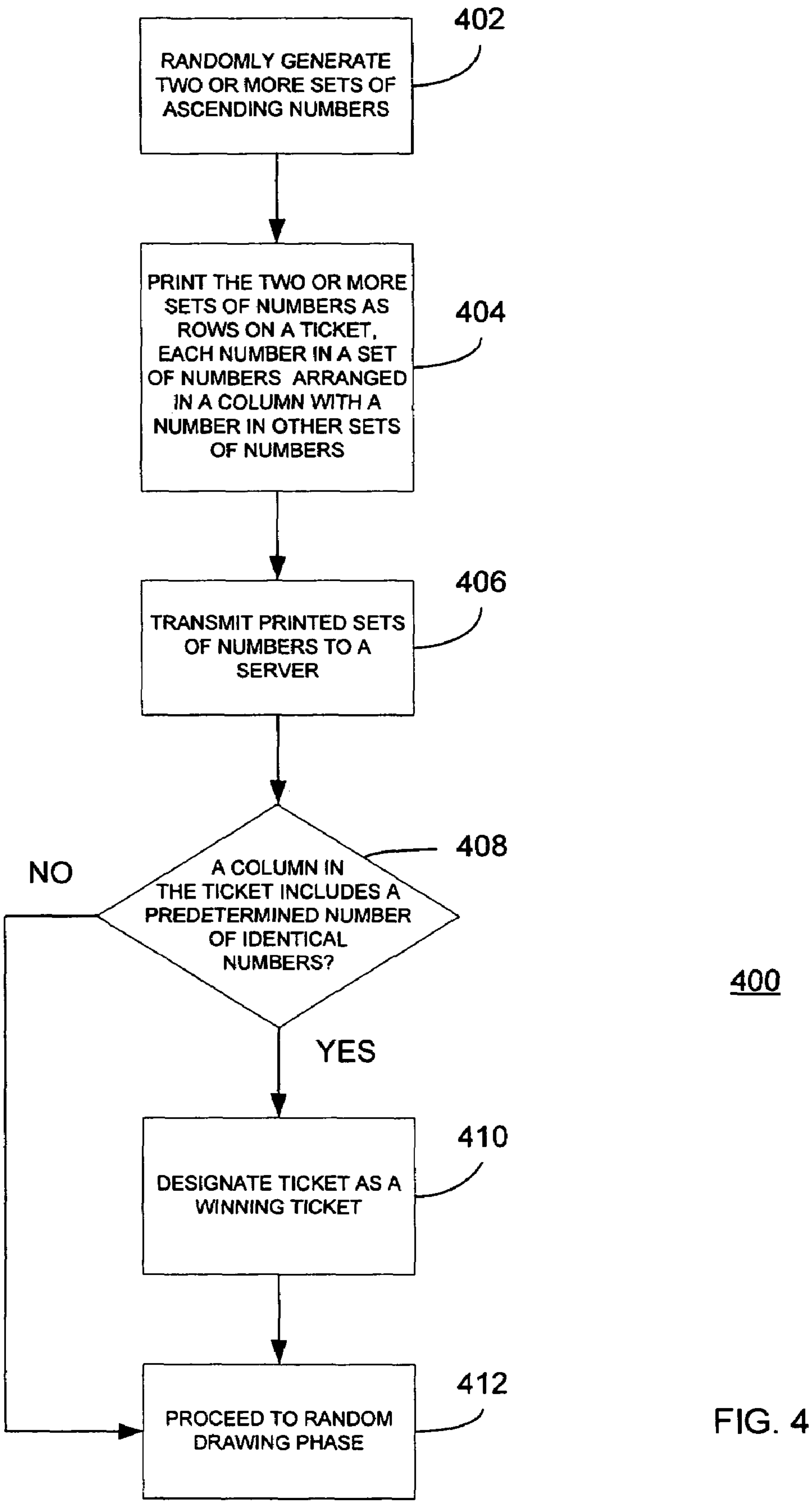
FIG. 4 is a flowchart of an instant result lottery system.

FIG. 4 illustrates a method 400 for playing a lottery game using the system 300 shown in FIG. 3. At 402, two or more sets of numbers are randomly generated. Each set of numbers has a predefined number of numbers. The sets of numbers are arranged such that each set of numbers has a repeatable patter, i.e. ascending from smallest to largest. At 404, the two or more sets of numbers as arranged are printed on a ticket. In an exemplary embodiment, each number in a set of numbers is arranged in a column with a number from each of the other sets of numbers. Preferably, the ticket contains more than five sets of numbers printed thereon.

At 406, the sets of numbers that have been printed on the ticket are transmitted to a server, for validation and record-keeping purposes. At 408, a determination is made whether a column on the ticket includes a predetermined number of identical numbers. If not, the ticket is not a winning ticket, although may be used for a conventional lottery game in a drawing phase, at 412. If yes, the ticket can be designated a winning ticket at 410, and the player can win a jackpot.

The predetermined number of identical matches in a column can be dynamically fixed, so as to drive sales of "picks" of the sets of numbers. For example, if the predetermined number is 6, whereby six identical numbers in a column on the ticket represents a winning ticket, then players will be more inclined to buy six or more picks. Advantageously, whether a ticket is a winning ticket in the first chance aspect according to embodiments of the present invention, it can still be used in conventional lottery games according to a later random drawing and matching of the drawing to the picks on the ticket in a second chance aspect.

Although a few embodiments have been described in detail above, other modifications are possible. For example, letters or even symbols may be used in place of numbers. Also, some steps of the method represented in the flowchart of FIG. 4 may be rearranged without departing from the scope of the description herein. Other embodiments may be within the scope of the following claims.

The invention claimed is:

1. A method of playing a lottery, comprising:

printing two or more sets of numbers on a ticket, each set of numbers being randomly-selected by a random number generator program executed by a computer terminal, each set of numbers forming a row on the ticket and ascending in numerical quantity across the row, each number in each set of numbers being arranged in a column with a number in another set of numbers, the ticket being configured for comparison to a randomly-selected lottery number set to determine whether the ticket is a winning ticket of a first game if numbers in any one row on the ticket match at least a portion of the randomly-selected lottery number set, wherein the two or more sets of numbers are printed on the lottery ticket in response to a request by a user to purchase a quantity of sets of numbers that are entered for comparison with the randomly-selected lottery number set in the first game, the quantity of sets of numbers being user-selectable while providing for entry in a second game provided that the ticket comprises at least a predetermined number of sets of numbers; and determining, at the computer terminal that the ticket is a winning ticket of the second game if at least one column on the ticket includes at least the predetermined number of identical numbers, wherein the user can determine immediately upon receiving the ticket whether the ticket is the winning ticket in the second game and before the randomly-selected lottery number set is generated, and wherein odds of winning the second game improve as the quantity of sets of numbers on the ticket increases due to a greater chance of matching the predetermined number of identical numbers given a greater number of sets of numbers on the ticket.

2. A method in accordance with claim 1, wherein the predetermined number of identical numbers is between two and ten.

3. A method in accordance with claim 2, wherein the predetermined number of identical numbers is between five and seven.

4. A method in accordance with claim 1, further comprising transmitting, from the computer terminal to a server, the two or more sets of numbers printed on the ticket.

5. A method in accordance with claim 4, further comprising registering, in the server, the two or more sets of numbers printed on the ticket.

6. A method in accordance with claim 5, further comprising the server automatically reporting the winning ticket.

7. A method in accordance with claim 1, wherein the two or more sets of numbers is at least five sets of numbers.

8. A method in accordance with claim 1, wherein the predetermined number of identical numbers are contiguous.

9. A lottery system, comprising:

a computer terminal executing a random number generator program that randomly generates two or more sets of numbers for a player, the computer terminal further configured to print the two or more sets of numbers on a ticket, where each set of numbers forms a row and ascends in numerical quantity across the row, and each number in each set of numbers is arranged in a column with a number in another set of numbers, the ticket being configured for comparison to a randomly-selected lottery number set to determine whether the ticket is a winning ticket of a first game if numbers in any one row on the ticket match at least a portion of the randomly-selected lottery number set, wherein the two or more sets of numbers are printed on the lottery ticket in response to a request by a user to purchase a quantity of sets of numbers that are entered for comparison with the randomly-selected lottery number set in the first game, the quantity of sets of numbers being user-selectable while providing for entry in a second game provided that the ticket comprises at least a predetermined number of sets of numbers; and a server connected to the computer terminal and configured to register the two or more sets of numbers that are printed on the ticket, and to determine, according to a second game, whether at least one column on the ticket includes at least the predetermined number of identical numbers, wherein the user can determine immediately upon receiving the ticket whether the ticket is the winning ticket in the second game and before the randomly-selected lottery number set is generated, and wherein odds of winning the second game improve as the quantity of sets of numbers on the ticket increases due to a greater chance of matching the predetermined number of identical numbers given a greater number of sets of numbers on the ticket.

10. A lottery system in accordance with claim 9, wherein the random number generator program is a local application running on the computer terminal.

11. A lottery system in accordance with claim 9, wherein the server is further configured to determine a win if the ticket includes a column that includes the predetermined number of identical numbers.

12. A lottery system in accordance with claim 11, wherein the server is further configured to report the win.

13. A lottery system in accordance with claim 9, further comprising a printer connected to the computer terminal for printing the ticket with the two or more sets of numbers.

14. A method of playing a lottery, comprising:

selecting, with a random number generator program executed by a computer terminal, two or more sets of numbers ascending in numerical quantity;

printing the two or more sets of numbers on a ticket, each set of numbers forming a row on the ticket and ascending in numerical quantity across the row, each number in each set of numbers being arranged in a column with a number in another set of numbers, the ticket being configured for comparison to a randomly-selected lottery number set to determine whether the ticket is a winning ticket of a first game if numbers in any one row on the ticket match at least a portion of the randomly-selected lottery number set, wherein the two or more sets of numbers are printed on the lottery ticket in response to a request by a user to purchase a selected quantity of sets of numbers that are entered for comparison with the randomly-selected lottery number set in the first game, the quantity of sets of numbers being user-selectable while providing for entry in a second game provided that the ticket comprises at least a predetermined number of sets of numbers;

determining, at the computer terminal whether at least one column in the ticket includes at least the predetermined number of identical numbers according to a second game, wherein odds of winning the second game improve as the quantity of sets of numbers on the ticket increases due to a greater chance of matching the predetermined number of identical numbers given a greater number of sets of numbers on the ticket; and designating the ticket as a winning ticket in the second game if the at least one column in the ticket includes the predetermined number of identical numbers, the designating as the winning ticket in the second game occurring immediately upon generation and before the randomly-selected lottery number set is generated for determining whether the ticket is the winning ticket in the first game.

15. A method in accordance with claim 14, wherein the predetermined number of identical numbers are contiguous.

16. A method in accordance with claim 14, wherein the predetermined number of identical numbers is at least five.

17. A method in accordance with claim 14, further comprising transmitting, from the computer terminal to a server, the two or more sets of numbers printed on the ticket.

18. A method in accordance with claim 17, further comprising registering, in the server, the two or more sets of numbers printed on the ticket.

19. A method in accordance with claim 17, further comprising the server automatically reporting the winning ticket.

* * * * *